United States Patent
Christl

(10) Patent No.: US 7,093,430 B2
(45) Date of Patent: Aug. 22, 2006

(54) METHOD AND DEVICE FOR IMPLEMENTING A METHOD FOR ASCERTAINING THE LOAD CONDITION OF A COMPONENT ARRANGED IN AN EXHAUST-GAS REGION OF AN INTERNAL COMBUSTION ENGINE

(75) Inventor: Werner Christl, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 57 days.

(21) Appl. No.: 10/859,791

(22) Filed: Jun. 3, 2004

(65) Prior Publication Data

US 2005/0000207 A1    Jan. 6, 2005

(30) Foreign Application Priority Data

Jun. 4, 2003    (DE)    ................................ 103 25 183

(51) Int. Cl.
*F01N 3/00* (2006.01)

(52) U.S. Cl. ............................ 60/295; 60/274; 60/289; 60/290; 60/291; 60/311

(58) Field of Classification Search .................. 60/274, 60/278, 285, 289, 290, 291, 292, 293, 295, 60/297, 311

See application file for complete search history.

(56) References Cited

U.S. PATENT DOCUMENTS

| | | | | |
|---|---|---|---|---|
| 5,063,736 A | * | 11/1991 | Hough et al. .................. | 60/286 |
| 6,304,815 B1 | * | 10/2001 | Moraal et al. .............. | 701/115 |
| 6,634,170 B1 | * | 10/2003 | Hiranuma et al. ............ | 60/295 |
| 6,655,133 B1 | * | 12/2003 | Kimura et al. ................ | 60/296 |
| 6,698,192 B1 | * | 3/2004 | Ootake ........................ | 60/297 |
| 6,817,174 B1 | * | 11/2004 | Igarashi et al. ............... | 60/295 |
| 6,829,890 B1 | * | 12/2004 | Gui et al. ..................... | 60/295 |

FOREIGN PATENT DOCUMENTS

| DE | 101 12 138 | 9/2002 |
|---|---|---|
| EP | 1 229 223 | 8/2002 |

* cited by examiner

*Primary Examiner*—Binh Q. Tran
(74) *Attorney, Agent, or Firm*—Kenyon & Kenyon LLP

(57) ABSTRACT

A method and a device for implementing a method for ascertaining the load condition with an exhaust-gas component of a component arranged in an exhaust-gas region of an internal combustion engine is provided in which an increase in the exhaust-mass flow of the internal combustion engine and a detection of a pressure change in the exhaust-gas region in front of the component is specified. The load condition of the component is determined from the pressure change.

10 Claims, 2 Drawing Sheets

METHOD AND DEVICE FOR IMPLEMENTING A METHOD FOR ASCERTAINING THE LOAD CONDITION OF A COMPONENT ARRANGED IN AN EXHAUST-GAS REGION OF AN INTERNAL COMBUSTION ENGINE

BACKGROUND INFORMATION

In German Patent Application No. DE 101 12 138, a method and a device for monitoring a differential-pressure signal occurring at a diesel particle filter are described. The pressure occurring in front of the diesel particle filter or the pressure differential occurring at the diesel particle filter may be utilized as a measure for the load condition of the diesel particle filter. The diagnosis of the signal is based on the evaluation of a signal change with respect to a change in the exhaust-volume flow or the exhaust-mass flow. A change in the exhaust-volume flow is derived from corresponding changes in the performance characteristics of the internal combustion engine. A change takes place in a load change, for example, and/or when the engine speed is modified.

The present invention is based on the objective of providing a method and a device for ascertaining the load condition of a component arranged in an exhaust-gas region of an internal combustion engine, which take the pressure in front of the component into account.

SUMMARY OF THE INVENTION

According to the method of the present invention and the device of the present invention for implementing the method, a selective increase in the exhaust-volume flow or the exhaust-mass flow of the internal combustion engine and a detection of a pressure change in the exhaust-gas system in front of the component are provided. The load condition of the component with an exhaust-gas component, such as carbon black, is determined from the pressure change.

The measures provided according to the present invention may be realized by a simple intervention in the control of the internal combustion engine. The operating state of the internal combustion engine may be taken into account here. Selectively increasing the exhaust-volume flow or the exhaust-mass flow causes a pressure change in front of the component results in each case. On the basis of the pressure change the load condition of the component with the exhaust-gas component may be ascertained, for example with the aid of a stored correlation between a pressure change and a load condition. The amount of the increase in the exhaust-volume flow or the exhaust-mass flow may be permanently or variably predefined. In the following, only the exhaust-mass flow will be mentioned, which is tied to the exhaust-volume flow, temperature-dependent density.

The method according to the present invention and the device according to the present invention for implementing the method correspond to an evaluation of a step response, an at least approximately step-like change in the exhaust-mass flow being selectively specified.

A further refinement provides for the specification of a threshold value for the load condition of the component. If this threshold is exceeded, a regeneration of the component is initiated.

An advantageous further refinement provides for the pressure change in front of the component to be determined from the differential pressure occurring at the component. This measure increases the accuracy of the detection of the pressure change. A development of this refinement provides for the pressure occurring behind the component to be calculated.

A development specifies that the increase in the exhaust-mass flow of the internal combustion engine be provided by a reduction in an exhaust-gas recirculation rate. The particular advantage of this measure is that a change in the exhaust-gas recirculation rate has an only negligible effect on the output of the internal combustion engine.

According to another refinement, the increase in the exhaust-mass flow of the internal combustion engine may be implemented via an increase in the secondary air conducted to the exhaust-gas system. The advantage of this embodiment is that the fuel-air mixture in the cylinder of the internal combustion engine is not modified.

According to another development, the increase in the exhaust-mass flow of the internal combustion engine may be implemented by means of an electrical supercharger.

The individual measures for increasing the exhaust-mass flow may be provided both singly and in any combination.

An advantageous embodiment provides that the increase in the exhaust-mass flow be implemented in idle running of the internal combustion engine at which an at least approximately stationary operating state is present. This measure yields especially reproducible results. This considerably reduces the effect of non-stationary states, which often occur outside of idle running of the internal combustion engine, on the result in the determination of the load condition of the component.

A catalytic converter and/or a particle filter, for instance, especially a diesel particle filter, may be provided as component arranged in the exhaust-gas region of the internal combustion engine.

The method according to the present invention and the device according to the present invention for implementing the method make it possible to detect the load condition of the particle filter, for example, using simple means, so that a required regeneration may be initiated at the correct moment. This measure yields the lowest possible fuel consumption of the internal combustion engine.

DETAILED DESCRIPTION

Figure 1:
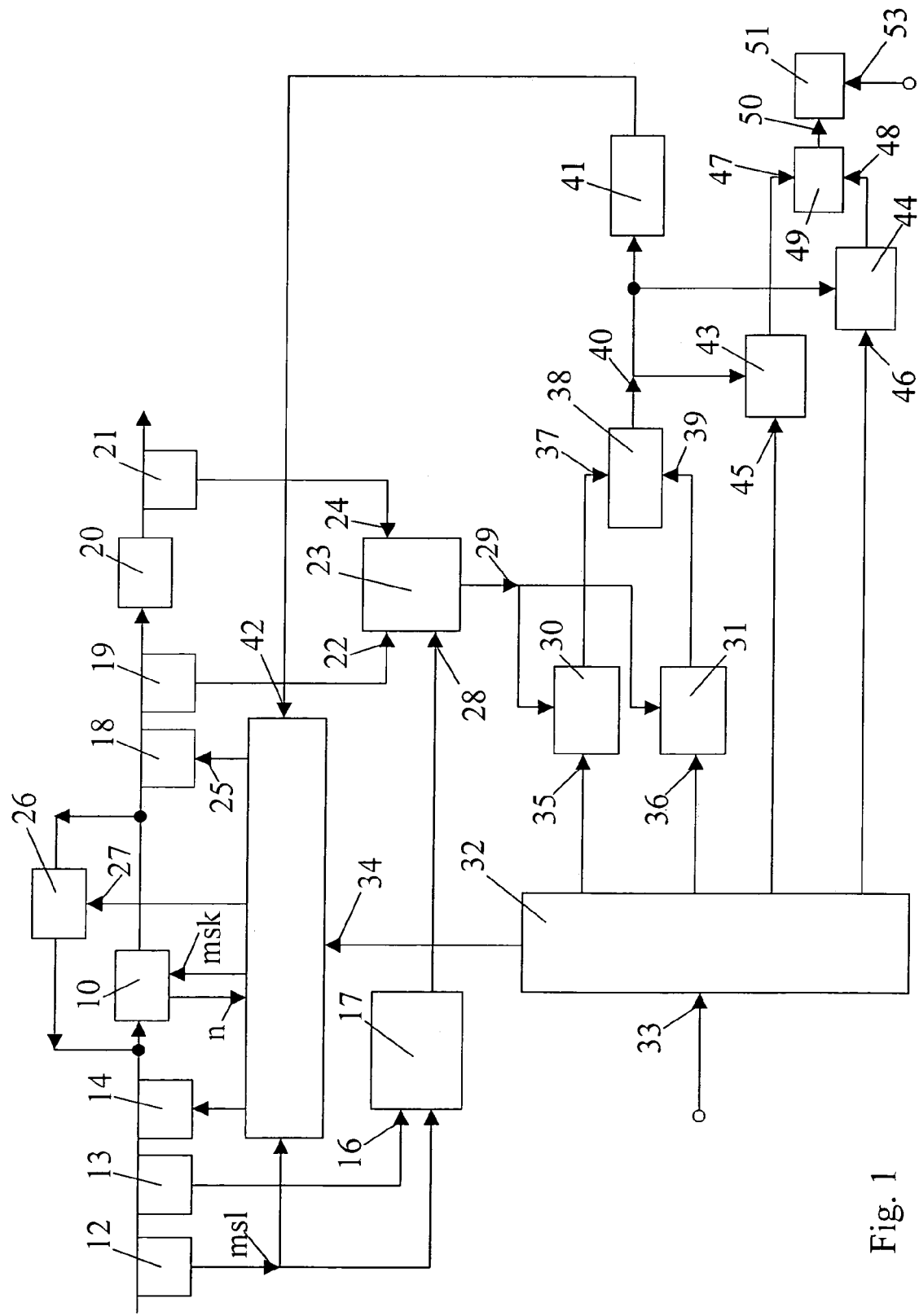
FIG. 1 shows a technical environment in which a method according to the present invention is running.

FIG. 1 shows an internal combustion engine 10 in whose intake region 11 an air-mass flow sensor 12, a first pressure sensor 13 and a supercharger 14 are arranged. Air-mass flow sensor 12 transmits an air-mass flow signal ms1 to an engine control 15. Air-mass flow signal ms1 as well as a first pressure signal 16 provided by first pressure sensor 13 are conveyed to an exhaust-mass flow detection 17.

Engine control 15 transmits a fuel-mass flow signal msk to internal combustion engine 10. Internal combustion engine 10 provides engine control 15 with a rotational speed signal n.

Arranged in an exhaust-gas region 18 of internal combustion engine 10 are a secondary air blower 18, a second pressure sensor 19, a component 20 as well as a third pressure sensor 21. Second pressure sensor 19 transmits a second pressure signal 22 to a differential-pressure detection 23, which transmits a third pressure signal 24 to third pressure sensor 21.

Internal combustion engine 10 transmits a secondary-air blower control signal 25 to secondary-air blower 18 and an exhaust-gas recirculation valve control signal 27 to an exhaust-gas recirculation valve 26.

Differential-pressure detection 23, to which a pressure signal 28 calculated by exhaust-mass flow detection 17 is supplied as well, transmits a differential-pressure signal 29 both to a first pressure-signal memory 30 and to a second pressure-signal memory 31.

After a start signal 33 has occurred, a sequencing control 32 transmits a change signal 34 to engine control 15, a first memory signal 35 to first pressure-signal memory 30 and a second memory signal 36 to second pressure-signal memory 31.

First pressure-signal memory 30 sends a first stored pressure signal 37 to a first pressure-differential detection 38, to which a second stored pressure signal 39, which is provided by second pressure-signal memory 31, is transmitted as well. First pressure-differential detection 38 transmits a first pressure-differential signal 40 to a first pressure-differential comparator 41, which sends a regeneration signal 142 to engine control 15.

First pressure-differential signal 40 is also conveyed to a first memory 43 and a second memory 44. First memory 43 receives from sequencing control 32 a third memory signal 45, and second memory 44 receives a fourth memory signal 46. First memory 43 transmits a third stored pressure signal 47 and second memory 44 a fourth stored pressure signal 48 to a second pressure-differential detection 49, which transmits a second pressure-differential signal 50 to a second pressure-differential comparator 51.

A first comparison signal 52 is transmitted to first pressure-differential comparator 41 and a second comparison signal 53 is supplied to second pressure-differential comparator 51.

Figure 2:
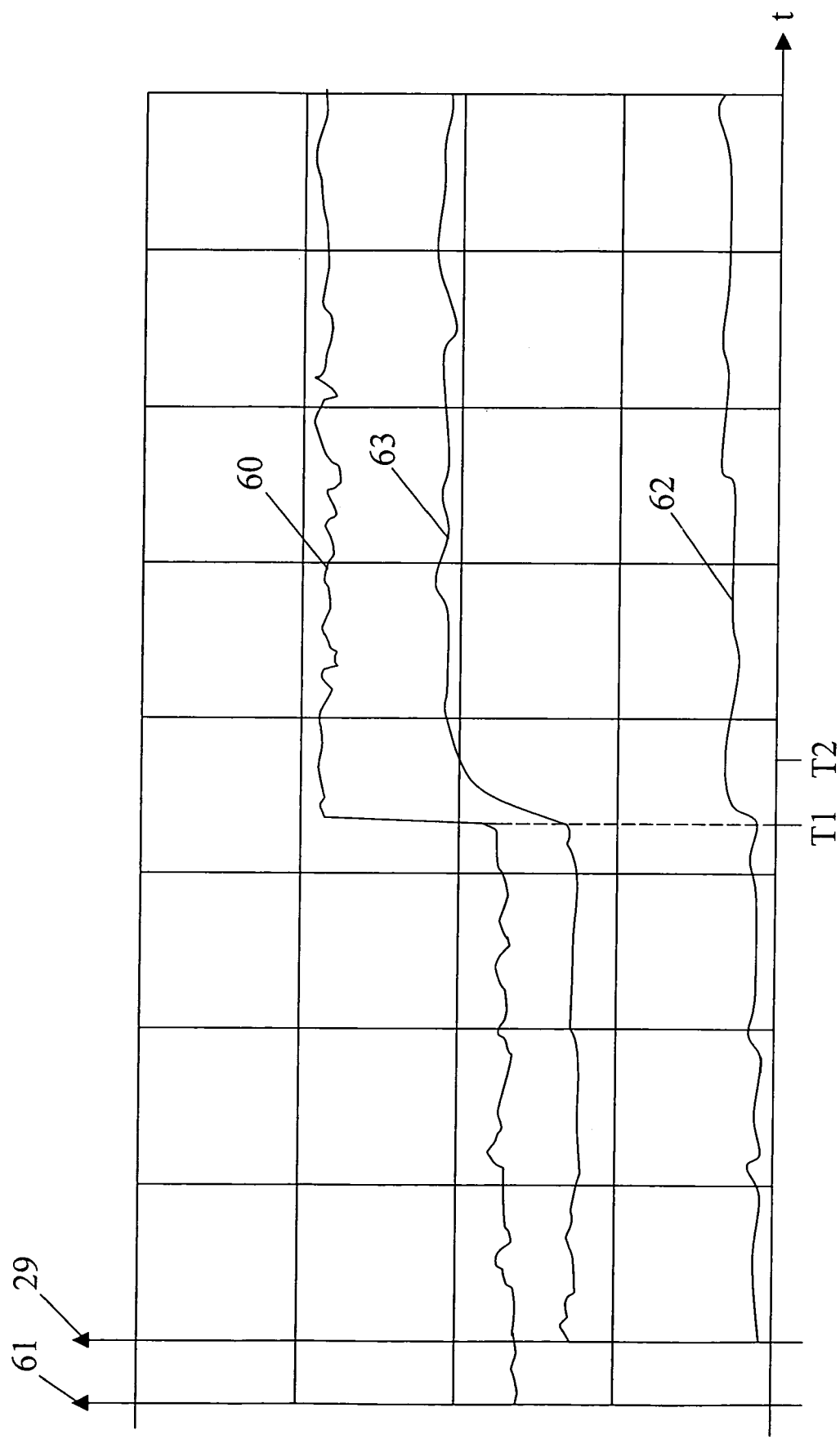
FIG. 2 shows signal curves as a function of time.

FIG. 2 shows three signal curves as a function of time t. A first signal curve 60 shows a time characteristic of exhaust-mass flow 61; a second signal curve 62 shows a first time characteristic of pressure-differential signal 29; and a third signal curve 63 shows a second time characteristic of pressure-differential signal 29. The three signal curves 60, 62, 63 have an amount change at a first instant T1. The amount changes are concluded at a second instant T2.

The method according to the present invention and the device according to the present invention for implementing the method are discussed in greater detail on the basis of signal curves 60, 62, 63 shown in FIG. 2.

Upon the occurrence of switching signal (start signal) 33, the load condition of component 20 with at least one exhaust-gas component is to be determined. Component 20 is a catalytic converter, for example, arranged in an exhaust-gas region 18 of internal combustion engine 10. Component 20 may also be a particle filter, in particular a diesel particle filter. The exhaust-gas component is preferably solid exhaust-gas components such as black carbon or ash, especially oil ash. Start signal 33 occurs, for example, at periodic time intervals during operation of internal combustion engine 10. Furthermore, start signal 33 may be a function of fuel-mass flow signal msk whose time integral is a measure for the fuel mass supplied to internal combustion engine 10 during operation.

Start signal 33 is preferably supplied only when internal combustion engine 10 is in idling operation. Idling operation may be determined on the basis of air-mass flow signal msl, for example, and/or fuel-mass flow signal msk and/or engine speed signal n. Furthermore, idling speed may be detected on the basis of an input signal (not shown further) of engine control 15, which is to establish the output or the torque of internal combustion engine 10.

If start signal 33 is present, sequencing control 32 transmits change signal 34 to engine control 15, which selectively leads to an increase in exhaust-mass flow 61. Change signal 34 induces engine control 15 to transmit secondary-air blower control signal 25, for instance. Secondary-air blower 18 thereupon increases the conveying capacity, so that an increase results in the exhaust-mass flow. Another measure, which may possibly be specified in addition, allows for engine control 15 to trigger supercharger 14, which leads to an increased air flow in intake region 11 of internal combustion engine 10. Supercharger 14 is designed as electrical supercharger, which is thus able to be controlled independently of the speed of the internal combustion engine. A particularly advantageous measure, which may possibly be specified in addition as well, provides that change signal 34 induce engine control 15 to change exhaust-gas recirculation valve control signal 27. The change occurs in the sense of a reduction inofhe exhaust-gas recirculation rate, which may be set by means of exhaust-gas recirculation valve 26. The reduction in the exhaust-gas recirculation rate causes an increase in exhaust-volume flow 61. The particular advantage of this measure as compared to the other described measures is that the reduction in the exhaust-gas recirculation rate has no effect, or only a very negligible effect, on the power behavior of internal combustion engine 10.

When exhaust-volume flow 61 is increased, the signals to be predefined by engine control 15 must be specified in such a way that the speed of internal combustion engine 10 changes as little as possible. Particular attention must be paid to this point when internal combustion engine 10 is in idling operation, since the operator of internal combustion engine 10 will very easily notice any speed change in this operating state. The easiest way of achieving this goal is to influence an idle-speed controller (not shown further).

The selective increasing of exhaust-mass flow 61 leads to an increase in the pressure in front of component 20. The pressure increase is detected by second pressure sensor 19, which is arranged in front of component 20. In principle, it is sufficient to examine second pressure signal 22, which is provided by second pressure sensor 19. However, the examination of the pressure differential occurring at component 20 is advantageously provided. This measure increases the accuracy in that it considerably reduces the influence of the pressure changes arising as a result of the change in the flow in exhaust-gas region 18. To be able to measure the pressure differential, third pressure sensor 21, which provides third pressure signal 24, is provided behind component 20.

An alternative embodiment provides for the pressure behind component 20 to be calculated. To this end, exhaust-mass flow detection 17 is provided, which generates pressure signal 28 calculated from determined exhaust-mass flow 61, which may replace third pressure signal 24 and thus third pressure sensor 21. Exhaust-mass flow detection 17 ascertains exhaust-mass flow 61, for example from air-mass flow signal msl, which is provided by air-mass flow sensor 12. If necessary, first pressure signal 16 provided by first pressure sensor 13, which is often present anyway, is considered in addition.

In the following, it is assumed that, instead of the one pressure signal provided by second pressure sensor 19, it is differential-pressure signal 29, detected by pressure-differential detection 23, that is evaluated.

Simultaneously with the outputting of change signal 34 to engine control 15 at first instant T1, sequencing control 32 transmits first memory signal 35 to first pressure-signal memory 30. First memory signal 35 may also be output a short time before first instant T1 in order to ensure that first memory signal 35 occurs before a change in differential-pressure signal 29 may arise. First memory signal 35 induces first pressure-signal memory 30 to store differential-pressure signal 29 before the change in exhaust-mass flow 61 takes effect.

After the increase in exhaust-mass flow 61 has become effective, sequencing control 32 transmits, at second instant T2, second memory signal 36 to second pressure-signal memory 31, which stores the then increased differential-pressure signal 29. The time difference between first and second instant T1, T2 may be determined on the basis of experiments.

First stored pressure signal 37 and second stored pressure signal 39 may be processed into first pressure-differential signal 40 in first pressure-differential detection 38. First pressure-differential signal 40 reflects the pressure increase that has occurred as a result of the increase in exhaust-mass flow 61. The pressure increase both in second and in third signal pattern 62, 63 occurs between first and second instant T1, T2. Second signal curve 62 reflects the conditions in a low load state of component 20, and third signal curve 63 in an increased load state of component 20. In an increased load condition of component 20 with the exhaust-gas component and in an unchanged exhaust-volume flow 61, the pressure is higher than in a low load condition. Furthermore, the pressure differential occurring in response to an increase in exhaust-mass flow 61 is greater in a higher load condition than in a low load condition.

In a first development, a functional correlation between the pressure increase and the load condition of component 20 may be stored in a memory (not shown further). In this embodiment, first pressure-differential signal 40 may be utilized directly to indicate the load condition of component 20 with the exhaust-gas component.

In the exemplary embodiment shown in FIG. 1, first pressure-differential signal 40 is transmitted to first pressure-differential comparator 41, which compares first pressure-differential signal 40 to first comparison signal 52. First comparison signal 52 is a limit value 14 for the load condition of component 20; if it is exceeded, a regeneration of component 20 of the exhaust-gas component should be implemented. If the threshold has been exceeded, first pressure-differential comparator 41 transmits regeneration signal 42 to engine control 15, which thereupon initiates appropriate measures for regeneration of component 20. If component 20 is a particle filter, a certain minimum temperature of component 20 will be required for the regeneration of component 20. If the required temperature is not present, engine control 15 initiates measures to increase the temperature of the exhaust gas. The regeneration itself is initiated when the oxygen portion of the exhaust gas of internal combustion engine 10 is sufficient, which results in the particles being burned off.

An advantageous further development provides that the effect of a regeneration be evaluated. To this end, sequencing control 32 transmits third memory signal 45 to first memory 43, which stores first pressure-differential signal 40 as third stored pressure signal 47 prior to a regeneration of component 20. After the regeneration has been concluded, sequencing control 32 transmits fourth memory signal 46 to second memory 44, which thus stores first pressure-differential signal 40 following the regeneration as fourth stored pressure signal 48.

Second pressure-differential detection 49 ascertains second pressure-differential signal 50 from third stored pressure signal 47 and fourth stored pressure signal 48.

Second pressure-differential signal 50 then reflects the difference between the pressure increase before and after the regeneration. If the increase in exhaust-mass flow 61 was at least approximately constant both before and after the regeneration, second pressure-differential signal 50 is able to indicate the regeneration not only qualitatively but also quantitatively. Second pressure-differential comparator 51 compares second pressure-differential signal 50 to second comparison signal 53, which is a threshold value for the quality of the regeneration. If the threshold value is not exceeded, the regeneration was insufficient and must possibly be repeated. If the threshold value has not been exceeded despite a one-time regeneration or multiple regenerations, this may be an indication that component 20 is defective or that the regeneration measures were insufficient. In each case an error message may be generated alerting the operator of internal combustion engine 10 to this situation.

What is claimed is:

1. A method for ascertaining a load condition with an exhaust-gas component of a component situated in an exhaust-gas region of an internal combustion engine, the method comprising:
    providing an increase in an exhaust-mass flow of the internal combustion engine to induce a pressure change in the exhaust-gas region in front of the component;
    providing a detection of the pressure change in the exhaust-gas region in front of the component; and
    determining the load condition of the component from the pressure change.

2. The method according to claim 1, further comprising:
    providing a threshold value for the load condition of the component; and
    initiating a regeneration of the component if the load condition exceeds the threshold value.

3. The method according to claim 1, further comprising ascertaining the pressure change from a pressure differential occurring at the component.

4. The method according to claim 3, further comprising calculating a pressure occurring behind the component.

5. The method according to claim 1, wherein the increase in the exhaust-mass flow is implemented by reducing an exhaust-gas recirculation rate.

6. The method according to claim 1, wherein the increase in the exhaust-mass flow is implemented by increasing a supplied secondary air.

7. The method according to claim 1, wherein the increase in the exhaust-mass flow is implemented by means of an electrical supercharger.

8. The method according to claim 2, wherein the determination of the load condition is implemented before and after the regeneration of the component.

9. The method according to claim 1, wherein the increase in the exhaust-mass flow is implemented at least approximately in idling operation of the engine.

10. A device for implementing a method for ascertaining a load condition with an exhaust-gas component of a component situated in an exhaust-gas region of an internal combustion engine, the device comprising:
    means for providing an increase in an exhaust-mass flow of the internal combustion engine induce a pressure change in the exhaust-gas region in front of the component;
    means for providing the detection of a pressure change in the exhaust-gas region in front of the component; and
    means for determining the load condition of the component from the pressure change.

* * * * *

UNITED STATES PATENT AND TRADEMARK OFFICE
CERTIFICATE OF CORRECTION

PATENT NO. : 7,093,430 B2 Page 1 of 1
APPLICATION NO. : 10/859791
DATED : August 22, 2006
INVENTOR(S) : Christl It is certified that error appears in the above-identified patent and that said Letters Patent is hereby corrected as shown below:

Column 3, line 56, make a new paragraph beginning with "Start signal 33...."

Column 4, line 5, make a new paragraph beginning with "Change signal 34..."

Signed and Sealed this

Thirteenth Day of November, 2007

JON W. DUDAS
*Director of the United States Patent and Trademark Office*